United States Patent [19]
Voss

[11] 3,857,591
[45] Dec. 31, 1974

[54] PIPE COUPLING
[75] Inventor: Hans Hermann Voss, Donrgaul uber Wipperfurth, Germany
[73] Assignee: Armaturenfabrik Hermann Voss, Wipperfurth/Rhld., Germany
[22] Filed: Dec. 8, 1972
[21] Appl. No.: 313,361

[30] Foreign Application Priority Data
Dec. 11, 1971 Germany.......................... 7146704

[52] U.S. Cl. ........................... 285/341, 285/382.7
[51] Int. Cl. ........................................... F16l 19/06
[58] Field of Search ......... 285/382.7, 341, 342, 343

[56] References Cited
UNITED STATES PATENTS
| | | | |
|---|---|---|---|
| 1,983,840 | 12/1934 | Dohner | 285/382.7 X |
| 2,394,351 | 2/1946 | Wurzburger | 285/341 |
| 2,437,632 | 3/1948 | Wolfram | 285/342 |
| 2,452,275 | 10/1948 | Woodling | 285/341 |
| 2,775,471 | 12/1956 | Douglass | 285/341 X |
| 3,468,566 | 9/1969 | Nietzel | 285/382.7 X |

FOREIGN PATENTS OR APPLICATIONS
978,899 12/1964 Great Britain...................... 285/341

Primary Examiner—Thomas F. Callaghan
Attorney, Agent, or Firm—Allison C. Collard

[57] ABSTRACT

Pipe couplings for connecting pipe sections with two threadedly engageable coupling members, one of them acting as an outer coupling nut, with sealing means between the coupling members and the pipe section concerned, including a first, metallic ring interposed between the coupling nut and the pipe section, and a second, elastic ring in operative engagement with at least one of the coupling members and with the first ring, the latter and a coupling body having axial passages therein contiguous with that of the pipe section, and annular tooth means on inner wall portions of the first ring, for tight radial engagement with outer wall portions of the pipe section when the coupling nut is tightened about the coupling body and the sealing means.

3 Claims, 5 Drawing Figures

3,857,591

PIPE COUPLING

The invention relates to a screw-type pipe coupling having two threadedly engageable coupling members which encompass the elements serving to seal a connection of a pipe section.

In conventional pipe coupling elements, the threaded coupling parts, consisting generally of a coupling nut, a threaded coupling body enclosed between them as sealing and retaining elements, and a cutting ring which is inserted for axial displacement on the pipe end to be connected and pressed into a funnel-shaped interior recess of the threaded coupling body by means of the coupling nut to penetrate with its cutting edge into the outer wall surface of the pipe section.

Cutting rings usually have an inner, circular cutting edge which provides a usable sealing connection with calibrated pipes. As practice has shown, a particular disadvantage of screw-type pipe couplings equipped with sealing elements in the form of cutting rings is that leakage can occur under extreme operating conditions. This applies particularly to duct systems which are exposed to mechanical or hydraulic vibrations, pressure surges and the like. This can lead to the instability of the parts of the pipe coupling, pressed toward one another, so that the pressure medium can escape. It is often inconvenient and laborious to tighten the coupling nut in order to restore the seal. Frequently, connecting elements of this kind and even entire pipe ducts must be completely renewed since the screw-type pipe couplings cannot be secured by further tightening without limits.

There also are pipe couplings having a metallic sealing with two threaded coupling parts encompassing the sealing ring, and a threaded coupling body and a coupling nut. The abutment surface of the nut acts on a conically chamfered, rearward part of the envelope surface of the seal and thus leads to a radial contraction or compression of the ring onto the pipe surface. The sealing ring itself has an inward saw-tooth profile. When the threaded coupling parts are joined, the teeth penetrate slightly radially into the pipe surface, without substantially deforming the sealing ring. The seal for a screwed-on coupling nipple is a surrounding sealing ring which is turned up at its front side to dig itself into the threaded coupling body when the coupling parts are tightened.

Although this kind of screw-type coupling has the advantage of being adapted for radial assembly and disassembly, it nevertheless displays drawbacks insofar that the ring seals both inwardly and outwardly in metallic fashion. Although the inner sealing ring remains durable because of the ring teething provided, extreme loads weaken the pretensioning in time so that leakages occur at the forward metallic, ring-shaped seal.

It is an object of the present invention to improve weld-free and solder-free couplings to provide durable, absolute tightness. Moreover it is an object of the invention to provide a coupling which can be radially, or almost radially assembled and disassembled if necessary.

In the present invention, the sealing elements consist of a first metallic ring and a second ring made of an elastic or plastic material, cooperating with the former, wherein the inner wall surface of the metallic ring is equipped with ring-shaped cutters or teeth which can be pressed radially into the outer wall surface of the pipe to be connected. With these measures, an optimum and durable seal is created for pipe couplings.

Sealing rings of elastic materials could not be previously applied for screw-type couplings because they are not capable of exerting any sufficient retaining function on the pipe to be connected. In the present invention, combining a metallic sealing ring with an elastic and/or plastic sealing ring has various advantages. The rings have separate function so that the metallic ring with its annular teeth provides the inner seal of the pipe, while the ring of elastic material provides the external seal.

Moreover, the metallic sealing ring provides the retaining function of the pipe to be connected while the elastic ring provides the seal. Elastic and/or plastic rings possess a relatively high coefficient of friction and, more importantly, a considerable capability of altering their shape so that a coupling retains its tightness even when the coupling parts have slightly lost their original tension due to external influences.

In a further feature of the invention, the elastic sealing ring can be integrally formed with the metallic sealing ring as a unitary structure. The connection can be effected by glueing, vulcanizing or the like.

In a preferred embodiment of the invention, the metallic ring is provided with an annular groove to receive the elastic sealing ring. The metallic ring can be provided with circularly shaped abutment surfaces drawn radially inward to prevent an axial displacement between the connected pipe and the metallic ring during the tightening process. The coupling nut has a curved inner abutment surface for the radial contraction or compression of the metallic ring.

In a further feature of the invention, the metallic ring has a first region with an internal diameter corresponding to that of the pipe to be connected, so that the outer envelope or surface of this region conically tapers to the free end. The envelope surface has an annular groove to receive the elastic sealing ring. A second region of the ring displays an internal diameter which corresponds to the external diameter of the pipe to be connected. This region of the ring is equipped on the inside with annularly shaped surrounding teeth, radially penetrating into the pipe. In this embodiment, the annular region equipped with teeth assumes a seal relative to the pipe while the elastic ring seals against the tightened coupling part surrounded by the coupling nut.

In a further refinement of the invention, the part overlapped by the coupling nut has on its facing wall which lies within the pipe coupling a protruding surrounding web. The elastic sealing ring is supported against the end surface of this web, the ring and the web being overlapped by a protruding collar of the metallic sealing ring. The free end of the ring supports itself on the annulus of a step-shaped ledge which borders on the axial extension of the web. As a result, the ring cutters of the metallic ring merely exert a retaining function on the pipe to be connected so that the elastic and/or plastic ring takes over the sealing.

The invention is further realized when the mutually corresponding regions of the coupling parts and/or the metallic sealing ring are shaped as respective internal and external cones while the threaded coupling part has on its inside two step-shaped ledges. The end face of the pipe to be connected rests on the first ledge while the elastic sealing ring is supported by the second ledge. When the threaded coupling parts are tightened, the yielding elastic ring is initially compressed, and only when its limit of compressibility has been attained, are the cutting edges of the metallic ring pressed into the pipe envelope on further screw actuation of the coupling nut.

The invention further provides that a coaxial annular groove for receiving the elastic sealing ring is worked into the facing side end of the coupling. It is also possible to provide this groove in the metallic sealing ring itself so that the elastic ring, placed therein, acts against the end face of the threaded coupling part surrounded by the coupling nut.

In a preferred feature of the invention, the metallic ring has a conical envelope area over the region of its inwardly provided cutters. The radial compression of the ring ensues through an inner abutment area of the coupling nut, which is arcuately or double arcuately shaped. The outer envelope of the metallic retaining ring initially comes to lie tangentially at the arcuate abutment area of the coupling nut and, on progressive axial movement of the nut, this curved area acts upon the ring envelope so that the ring adapts itself to the curved shape of the coupling nut abutment area, due to the radial compression of the ring. To stabilize the pipe, the metallic sealing ring can be made with a tubular extension, having preferably smooth inner and outer wall surfaces in the end region remote from the elastic sealing ring, the extension at the end face possessing preferably an inner chamfering.

Other objects and advantages of the invention will be readily appreciated by reference to the following detailed description, when considered with the accompanying drawings, wherein similar reference characters denote similar elements throughout the several views.

Figure 1:
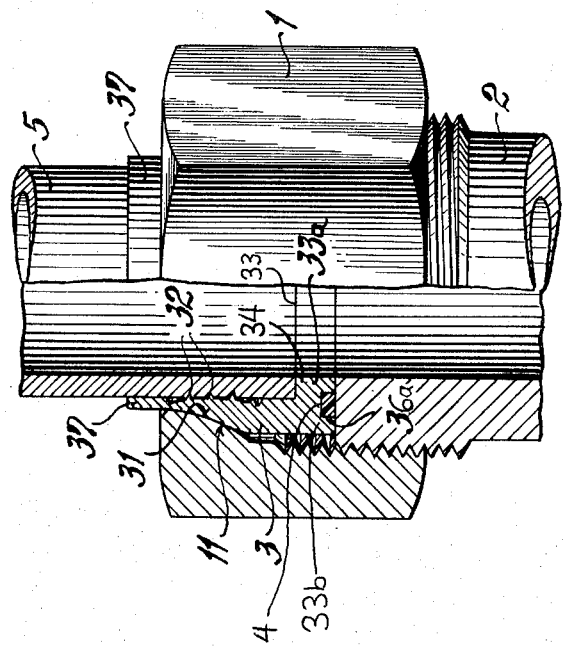
FIG. 1 shows a preferred embodiment of the inventive pipe couplings, partly in longitudinal section.

The exemplary embodiment of a screw-type pipe coupling shown in FIG. 1 comprises two threaded coupling parts, namely a coupling nut 1 and a coupling body 2, for connecting a pipe section 5, further including a first, metallic ring 3 and a second ring 4 of elastic and/or plastic material. Body 2 has its threaded top extension identified by numeral 24, and defines an inner passage 26 substantially aligned with that of ring 3, bearing numeral 34, and of pipe section 5, as shown.

In accordance with an optional feature of the invention, rings 3 and 4 can be made in the form of a single unitary structure, wherein the metallic ring is undetachably connected with the plastic or elastic ring, e.g. by glueing, vulcanizing or other known expedients.

Nut 1 has an inner, curve-shaped or arcuate abutment surface 11 against which the envelope of a frusto-conically shaped end portion 31 of ring 3 comes to lie tangentially, the same being conically shaped in its initial condition, in order to adapt itself to this curved shape, or on progressive axial movement, which nut 1 makes in the course of the tightening or screw-engaging process.

According to one of the important features of the invention, ring 3 has cutters or teeth 32 in its region coming directly into contact with nut 1, the number of the teeth being optional but should amount to more than two. These cutters penetrate radially into the outer wall surface of pipe section 5. The depth of penetration of teeth 32 is different when seen in the axial direction of ring 3, the penetration of the central cutters being the greatest.

Somewhat centrally of its longitudinal extension, ring 3 has an inwardly drawn abutment surface 33 against which the end face of pipe section 5 is supported. The ring region contiguous with abutment 33 has the bore 34 therein, defining the passage which is aligned with passage 26 of body member 2, the diameter of bore 34 preferably corresponding to the internal diameter of pipe 5 while an outer envelope or surface 35 of the region of ring 3 is conically shaped and corresponds to the internal cone of threaded coupling member 2.

Ring 3 has a surrounding groove 36 which penetrates into the conically shaped outer envelope 35, and in which ring 4 is accommodated. As can be seen from FIG. 1, ring 3 on the one hand fulfills a sealing function and on the other hand a retaining function in respect of pipe 5, while ring 4 acts sealingly in respect of the coupling member 2.

Figure 2:
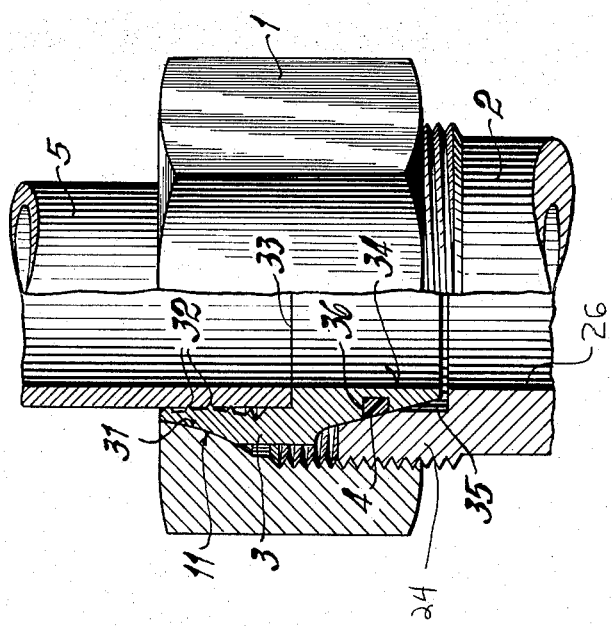
FIG. 2 is a modified pipe coupling embodiment.

The modified pipe coupling embodiment shown in FIG. 2 has the same basic construction as that of FIG. 1 for which reason the main components are provided with the same reference numerals. Ring 3 encompassed by threaded coupling parts 1, 2 has substantially an L-shape wherein the longer limb in its initial condition has a conical outer envelope 31. Ring 3 also has an inwardly drawn abutment surface 33.

The inner ring region which lies opposite to the conical outer envelope is provided with cutters 32 which, on tightening of nut 1, penetrate radially into the envelope of pipe section 5, nut 1 having an arcuate or curve-shaped abutment surface 11. Here again the depth of penetration of the middle teeth 32 is preferably the greatest.

The shorter limb 33a of ring 3 constitutes on the one hand an abutment for the end face of pipe 5 and has at the outside a concentric groove 36a in which is placed elastic ring 4. The latter, in this case, acts against the end face of the threaded coupling member 2. Ring 3 has a collar 33b protruding from groove 36a toward nut 1, as shown; it also has the earlier-described inner bore or passage 34. The sealing and retaining functions are here distributed to correspond to the first example, as shown in FIG. 1.

However the possibility is also given of placing an elastic sealing ring into a circular groove worked into the end face of coupling part 2, thus providing a seal against the facing side of ring 3 (not illustrated).

Ring 3, in continuation of the region provided with cutters 32, may have a tubular extension 37 which is narrowly supported at the envelope of pipe 5 and serves for stabilization. The inner end of the extension passes into the facing wall with a radius or with a chamfer.

Figure 3A:
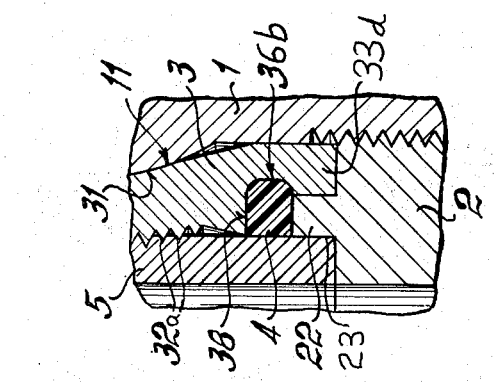
FIG. 3a shows yet another modified coupling embodiment in a somewhat enlarged partial sectional illustration, reversed as to its left- and right-hand sides as compared to the other illustrations.
Figure 3:
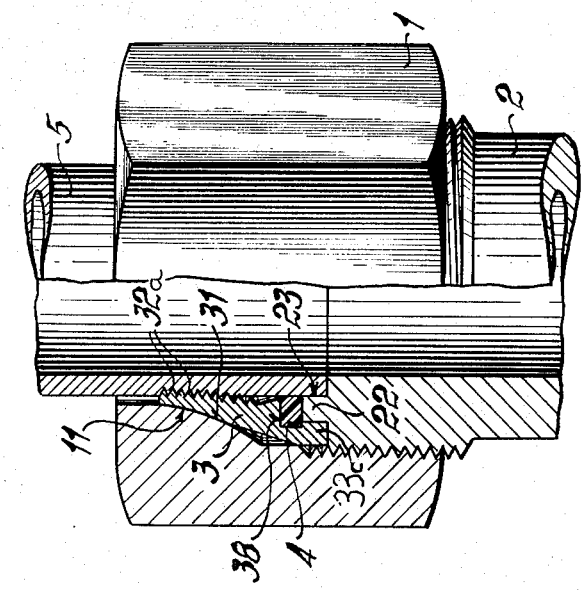
FIG. 3 is another modified embodiment of the inventive pipe couplings.

In another modified pipe coupling embodiment shown in FIG. 3, members 1, 2 completely surround and encompass ring 3. The latter has here a retaining function relating to pipe section 5 since sealing is accomplished by way of ring 4. Ring 3 has an outer envelope 31 and threads 32a (similar to cutters 32 of the two previous embodiments). Coupling nut 1 has abutment surface 11, as described before.

Coupling member 2 has at its inner end face a web-shaped portion or extension 22 the inner wall surface 23 of which is recessed relative to the inner diameter of member 2 so that pipe 5 is guided at its end. The outer wall surface of web 22 is also recessed relative to the external diameter of member 2 so that a protruding collar 33c of ring 3 can encompass or overlap web portion 22 in the outward direction.

Ring 3 has an abutment area 38 provided at the foot of collar 33c. Elastic ring 4 is positioned in the end face of web 22 and is pressed by the abutment area 38 against member 2, the envelope of pipe 5 and against collar 33c so that it guarantees an absolute sealing of the inventive pipe coupling, considering that ring 4 sits in a chamber practically closed from all sides.

FIG. 3a shows yet another modified embodiment in a sectional view similar to FIG. 3 but on an enlarged scale and reversed as to left and right. Ring 3 still has an inner circular groove 36b into which ring 4 is undetachably snapped. Pipe section 5 is also shown in this view. Coupling nut 1 is so shaped internally that a web-shaped extension 33d of ring 3 rests on it and cannot move away radially under the applied load. Nut 1 again has an abutment surface 11 while coupling member 2 has a web extension 22, an inner wall 23 of the latter, and finally ring 3 has an envelope 31, teeth 32a and an abutment area 38, similar to those already described.

Figure 4:
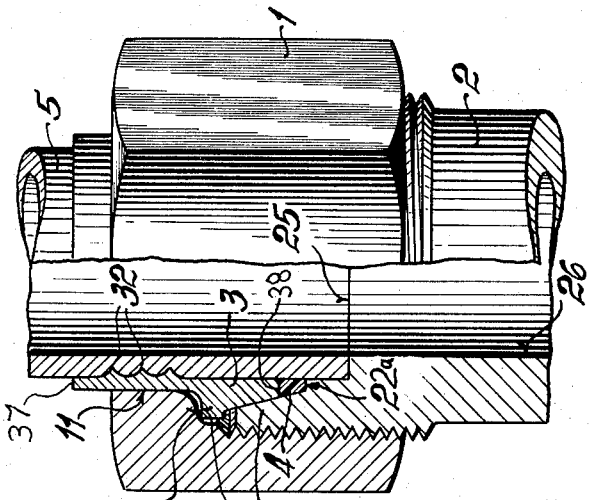
FIG. 4 is a further exemplary embodiment of a coupling according to the present invention.

Finally, the further exemplary embodiment of FIG. 4 again includes coupling members 1, 2, metallic ring 3 and ring 4 of preferably elastic material. The region of ring 3 at the top of the drawing is provided inwardly with cutters 32 digging into pipe section 5 while the outer envelope, opposite the cutters, is kept conical or cylindrical in the initial configuration of the ring and is touched by the arcuately shaped abutment area 11 of nut 1.

The region of ring 3 provided with teeth 32 can enlarge outwardly in a conical manner, and also in the direction of the end of the ring. Ring 3 displays a tubular extension 37 (similar to that described for FIG. 2), an abutment area 38, and an outwardly directed abutment 39 against which a stepped surface 12 of coupling nut 1 leans so as to press ring 3 in its conical region into the conical recess of coupling member 2 where its facing end acts against elastic ring 4.

The latter is positioned on a step-shaped ledge 22a of member 2. The latter also has a threaded top extension 24, a further step-shaped ledge 25 for receiving the end face of pipe 5, and the bore or passage 26 described earlier. It has an internal diameter which preferably strictly corresponds to that of the pipe section 5.

It should be understood, of course, that the foregoing disclosure relates only to preferred embodiments of the invention, and that it is intended to cover all changes and modifications of the examples described which do not constitute departures from the spirit and scope of the invention.

What is claimed is:

1. A pipe coupling comprising, in combination: two threadedly engageable coupling members (1, 2) one (2) of which is in the form of a body member and the other (1) is in the form of a nut member, including thread means for interengagement between said coupling members, thereby to connect sealingly a pipe section (5) to said body member, the pipe section having an axial passage for conveying a medium therethrough; sealing means (3, 4) between said coupling members and said pipe section, including a first metallic ring (3) interposed between said nut member and said pipe section and a second elastic sealing ring (4) in fluid-tight but resilient engagement with said body member and with said metallic ring; said nut member including an arcuate inner abutment surface (11) as a continuation of its thread means for tight metallic engagement with said metallic ring; the latter having an annular groove (36) for receiving therein said sealing ring; the surfaces of said metallic ring that are immediately adjacent said sealing ring on both sides of said groove providing additional tight metallic engagement with said body member; said metallic ring and said body member having respective axial passages (34, 26) therein substantially contiguous with said axial passage of the pipe section; wherein said metallic ring has a stepped axial bore (32, 33, 34) for receiving therein an end portion of the pipe section, including a first step region (34) with a smaller inner diameter that substantially corresponds to the diameter of said axial passage of the pipe section and a second axially spaced-apart step region (32) with a larger diameter that at least corresponds to the external diameter of the pipe section; the outer surface (35) of said first region conically tapering to the free end (24) of said body member; annular tooth means (32) on the inner wall portions of said second step region for tight radial engagement with outer wall portions of the pipe section when said nut member is tightened about said body member and said metallic ring; outer wall portions of said second step region being in the form of a frustoconical end portion (31) directed to said arcuate abutment surface of the nut member; and wherein said metallic ring has a radially inwardly drawn circularly shaped abutment surface (33) between said step regions, contiguous with said end portion of the pipe section.

2. The pipe coupling as defined in claim 1, wherein said sealing means constitutes a single unitary structure.

3. The pipe coupling as defined in claim 1 wherein more than two annular teeth are longitudinally spaced along the interior of an intact wall section of said first step region.

* * * * *